United States Patent [19]
Jones

[11] Patent Number: 4,700,308
[45] Date of Patent: Oct. 13, 1987

[54] METHOD OF FABRICATING SHEET METAL PARTS AND THE LIKE

[75] Inventor: Everett E. Jones, Wichita, Kans.

[73] Assignee: The Boeing Company, Seattle, Wash.

[21] Appl. No.: 942,261

[22] Filed: Dec. 16, 1986

Related U.S. Application Data

[63] Continuation of Ser. No. 726,701, Apr. 24, 1985, abandoned.

[51] Int. Cl.⁴ ............................................. G06F 15/46
[52] U.S. Cl. .................................... 364/468; 29/564; 364/472; 364/513; 901/6
[58] Field of Search ............................... 364/191–193, 364/468, 469, 472, 475, 476, 478, 513; 29/26 A, 428–431, 563, 564, 564.1, 568, 711, 791; 901/6, 7, 8; 414/730

[56] References Cited

U.S. PATENT DOCUMENTS

| | | | |
|---|---|---|---|
| 3,654,616 | 4/1972 | Dunne et al. | 901/8 X |
| 3,890,552 | 6/1975 | Devol et al. | 901/8 X |
| 4,260,940 | 4/1981 | Engelberger et al. | 318/568 X |
| 4,369,563 | 1/1983 | Williamson | 29/563 X |
| 4,427,431 | 1/1984 | Mumford | 364/476 X |
| 4,495,588 | 1/1985 | Nio | 364/513 |
| 4,517,653 | 5/1985 | Tsuchihashi et al. | 364/193 X |
| 4,571,694 | 2/1986 | Inaba et al. | 364/192 X |
| 4,602,345 | 7/1986 | Yokoyama | 364/191 X |
| 4,613,943 | 9/1986 | Miyake et al. | 364/191 X |

Primary Examiner—Joseph Ruggiero

[57] ABSTRACT

A method and apparatus for fabricating sheet metal parts using workpiece manipulators to transfer a workpiece from one work station to another and position the workpiece for each operation to be performed. The invention eliminates the need of individual operators and can be managed under microprocessor control using known positions along selected X and Y axes about which programming is performed.

14 Claims, 23 Drawing Figures

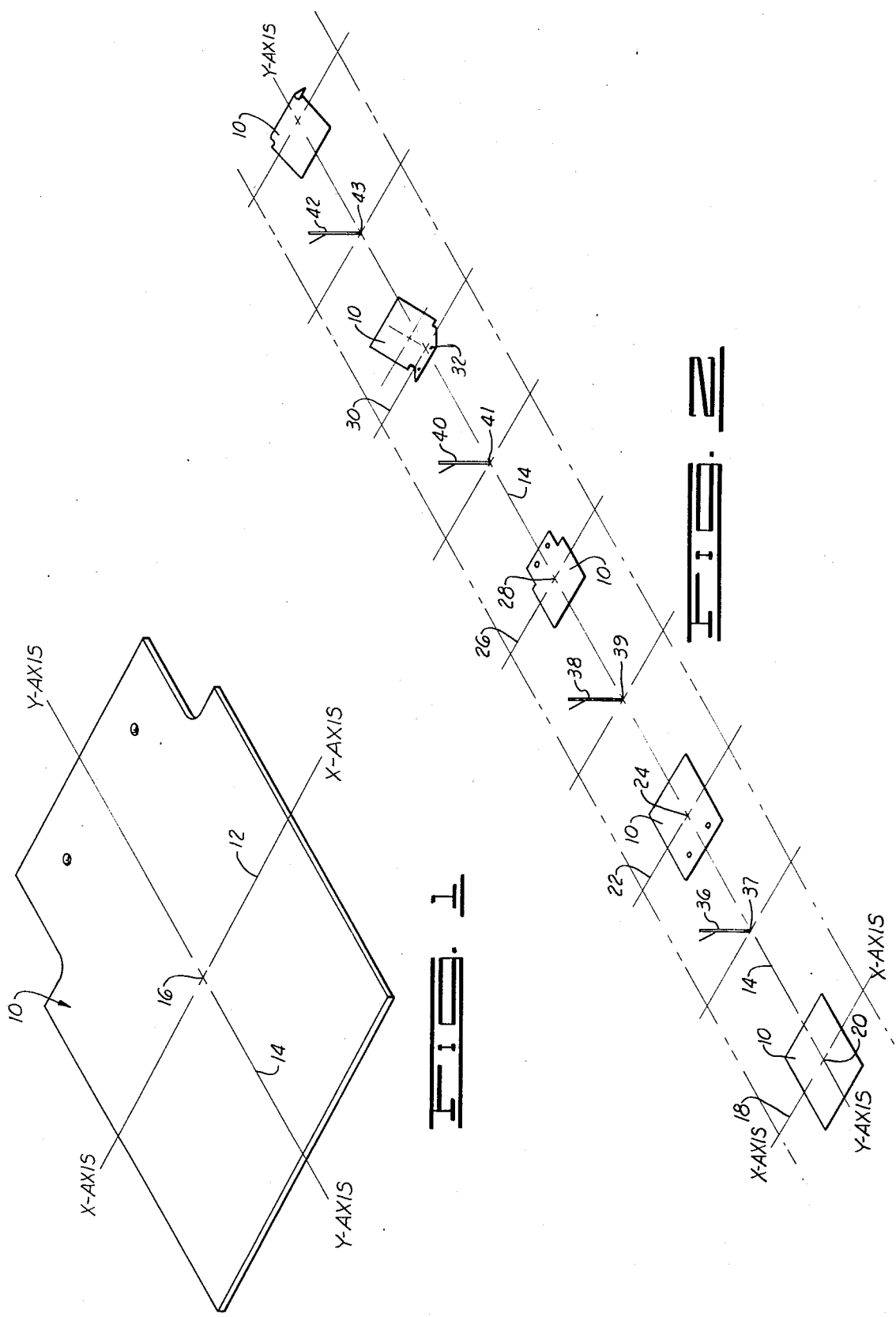

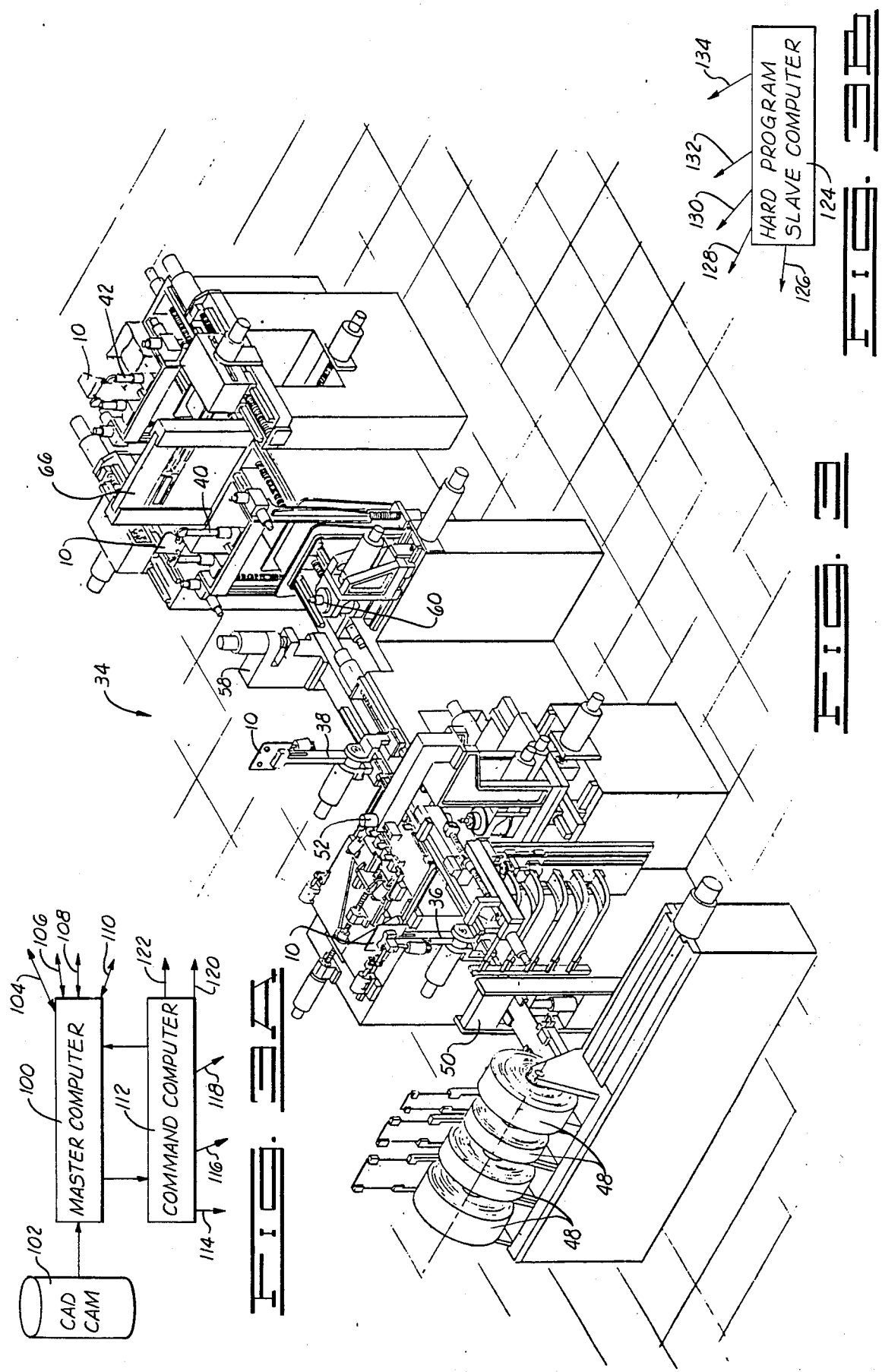

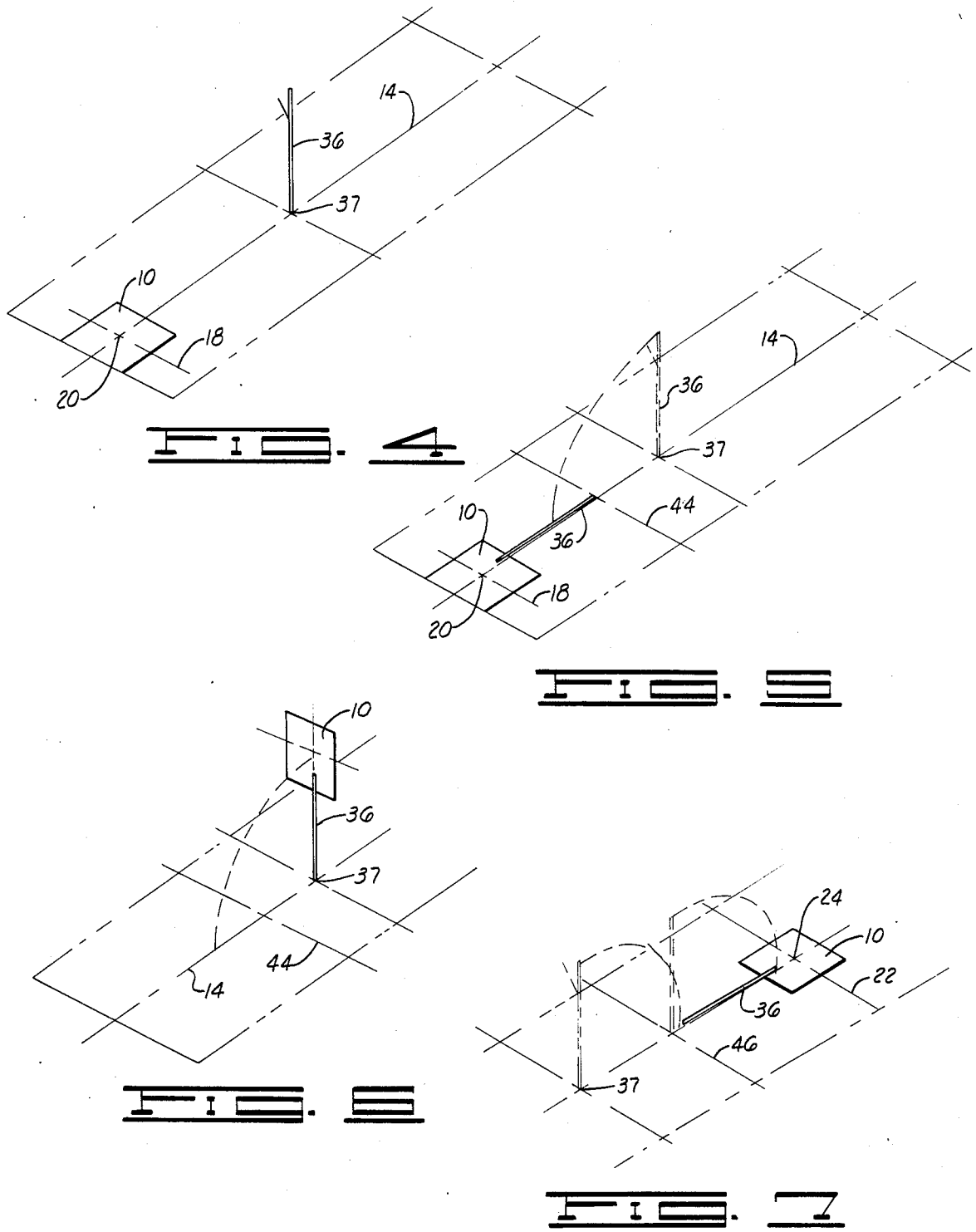

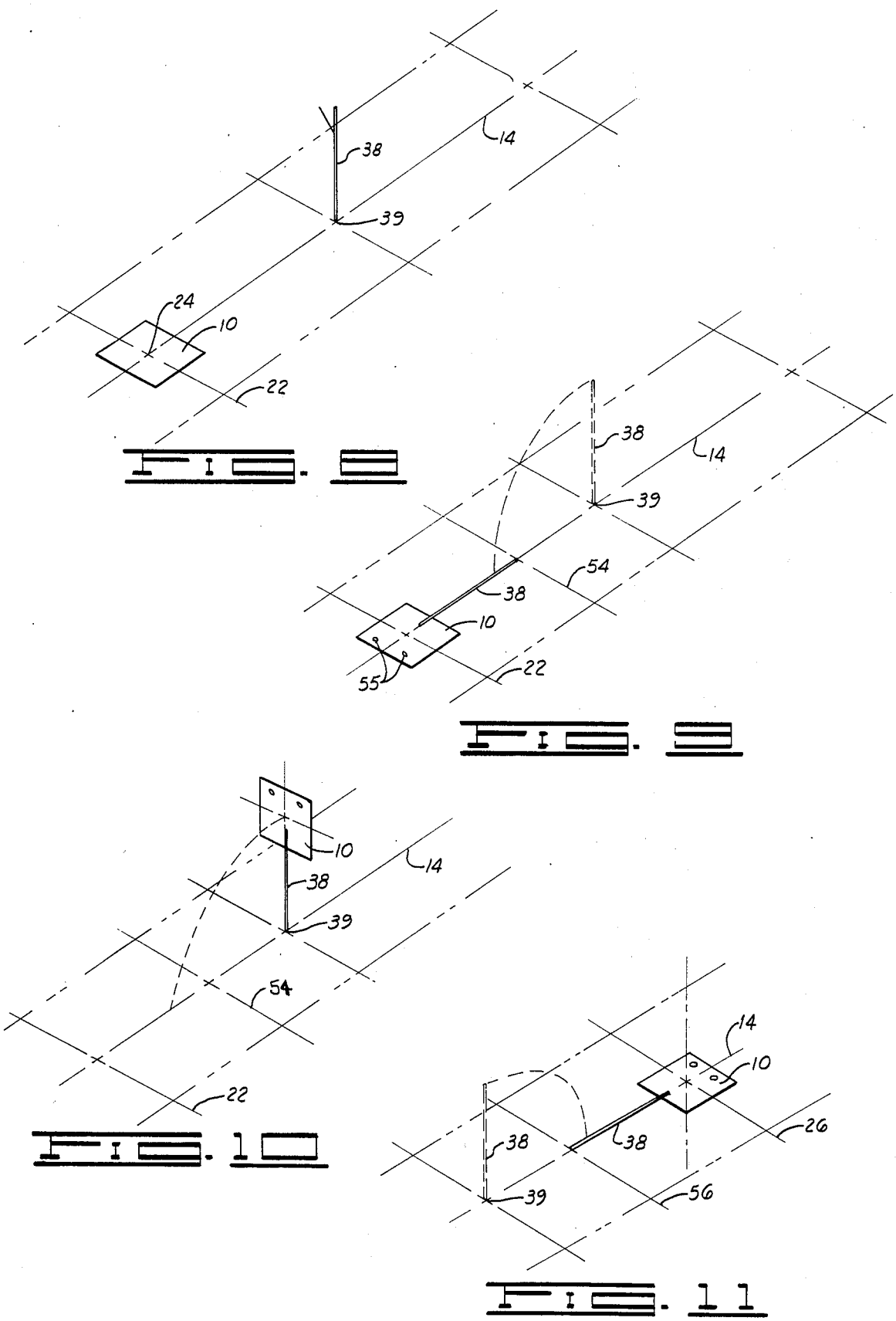

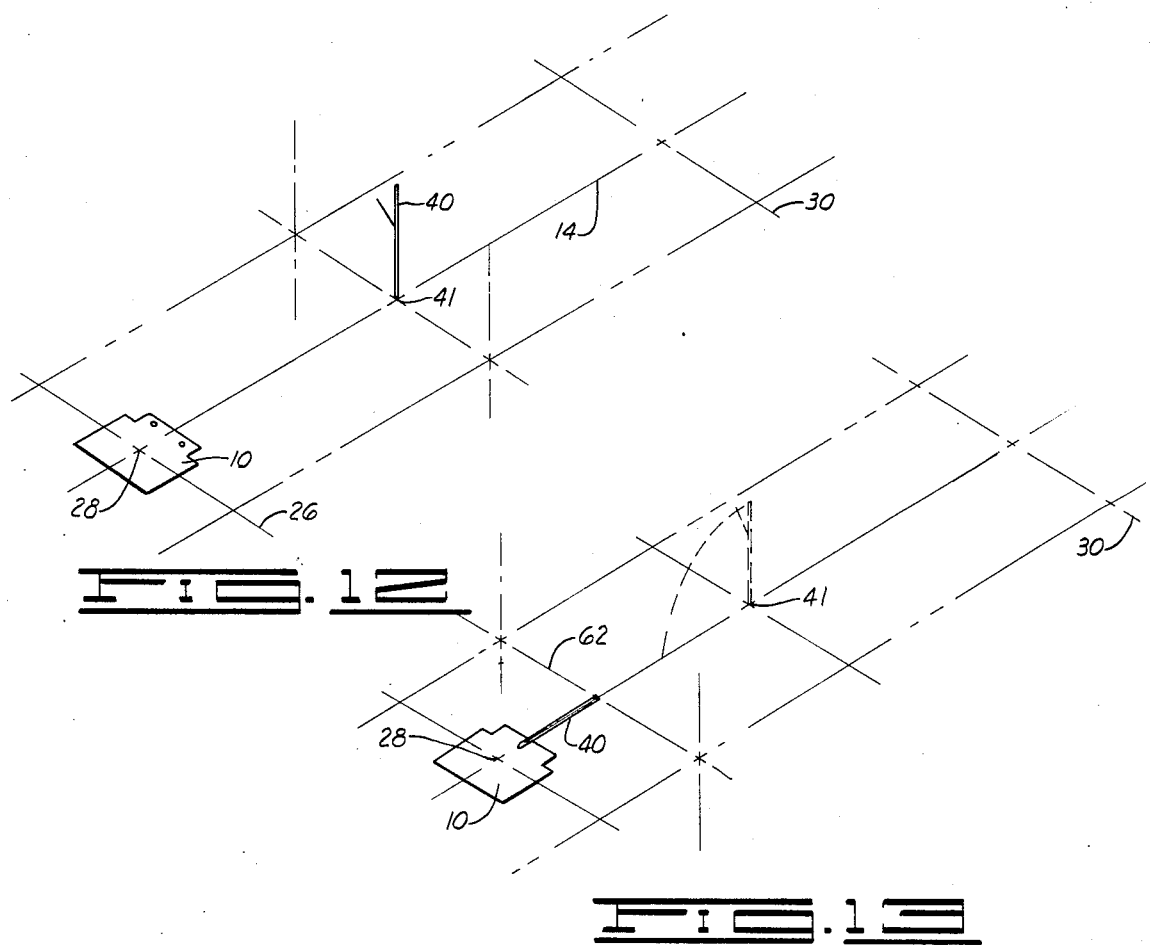
FIG. 12
FIG. 13
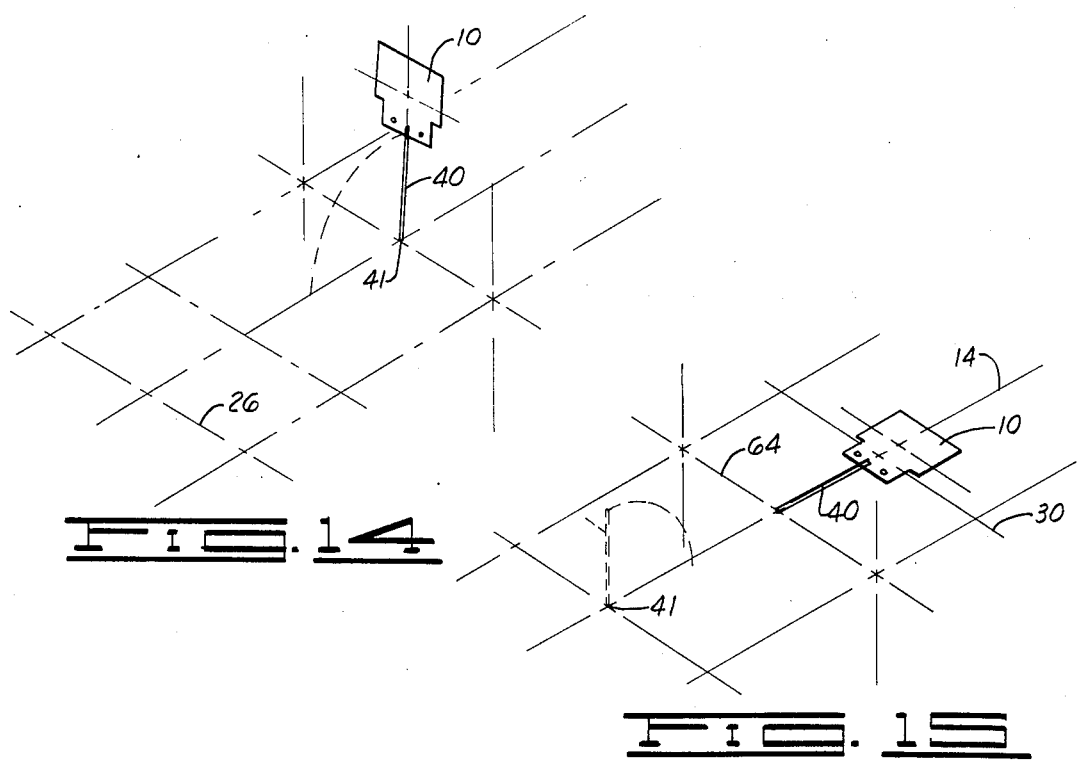
FIG. 14
FIG. 15

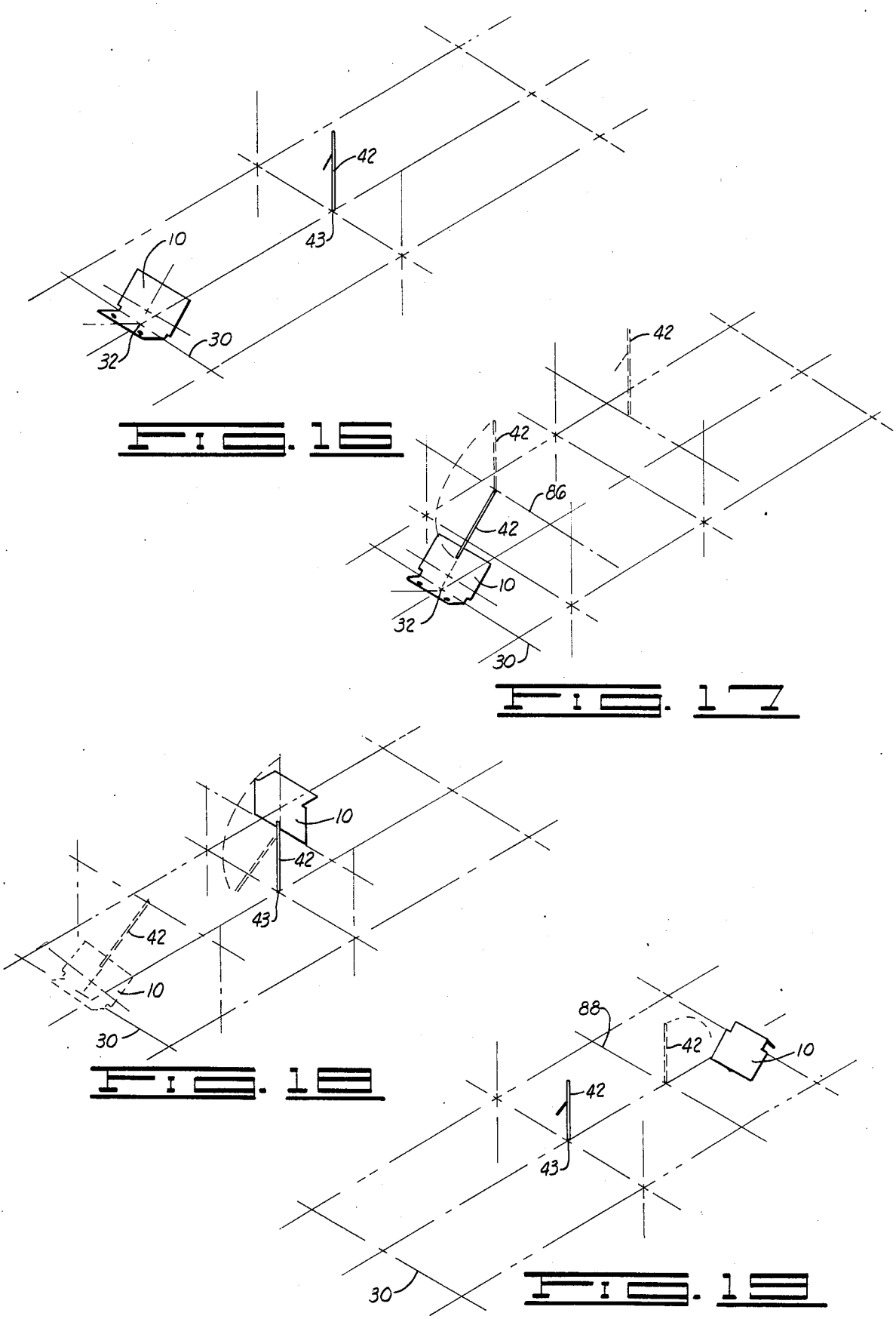

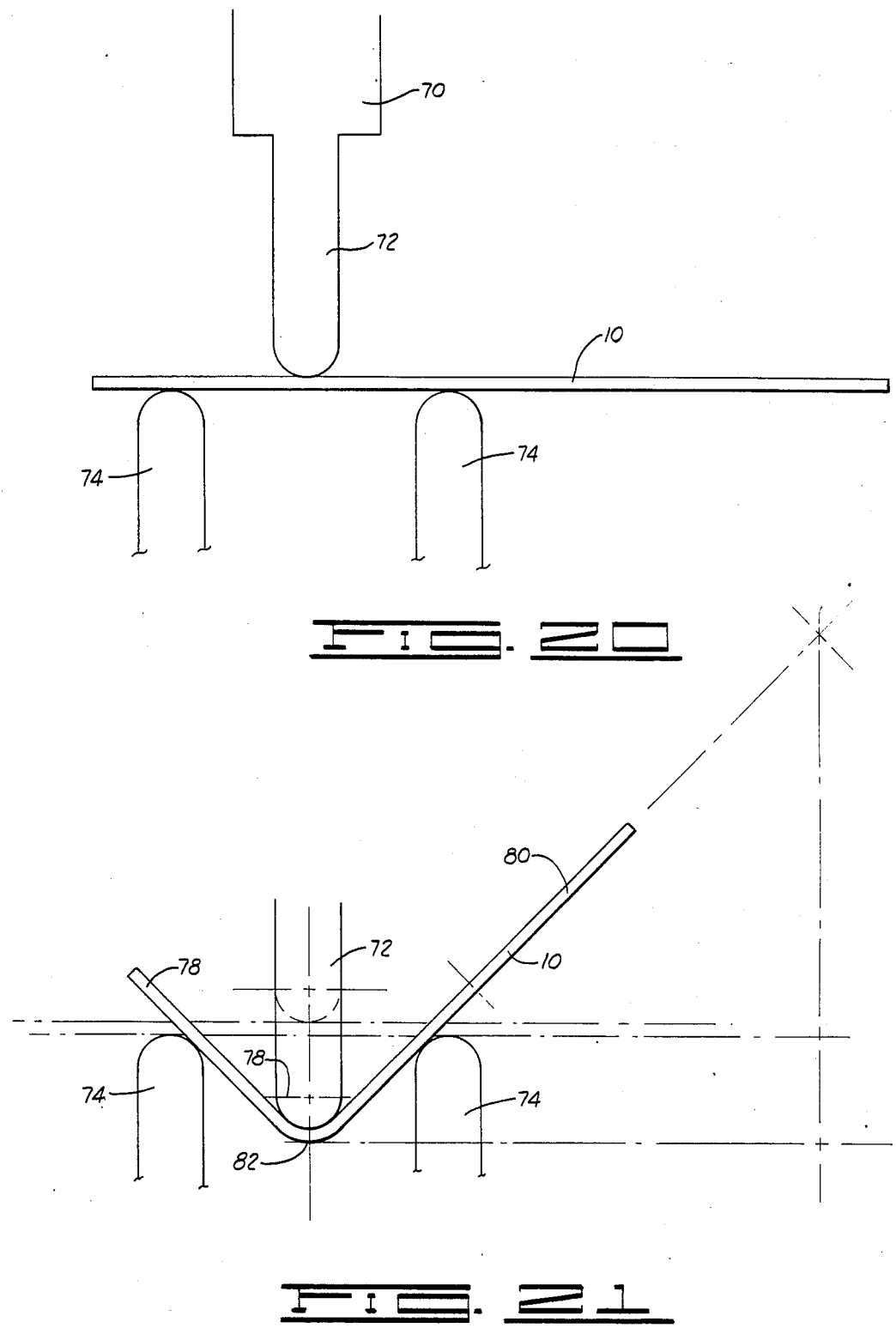

METHOD OF FABRICATING SHEET METAL PARTS AND THE LIKE

This application is a continuation of application Ser. No. 726,701, filed Apr. 24, 1985, now abandoned.

BACKGROUND OF THE INVENTION

This invention relates to the automation of fabricating sheet metal parts and more particularly fabricating sheet metal parts using workpiece manipulators such as robots under microprocessor control.

Heretofore, there have been various types of manufacturing control systems, tool installations using numerical control machines and other types of individual work stations having control under computer programs. These types of systems are described in the following United States Patents: U.S. Pat. No. 3,845,286 to Aronstein et al, U.S. Pat. No. 4,369,563 to Williamson, U.S. Pat. No. 4,272,812 to Svensson, U.S. Pat. No. 4,342,088 to Sato, U.S. Pat. No. 4,427,431 to Mumford, et al, U.S. Pat. No. 4,237,598 to Williamson. None of the mentioned prior art patents describe an overall method of fabricating a sheet metal part or the like using workpiece manipulators to transfer the workpiece from one work station to another under complete microprocessor control using known points along a selected X axis and a common Y axis.

SUMMARY OF THE INVENTION

The subject invention provides for an automated fabrication system for fabricating metal sheet parts or the like using manipulators under robotic control and managed by microprocessors using known points along selected X and Y axes.

The subject method of fabricating sheet metal parts being completely automated eliminates the need of individual operators for each work station.

The manipulators used in moving the workpiece from one station to another may be robotic controlled, servo-driven controlled and the like.

The method of fabricating a sheet metal part using workpiece manipulators to transfer a workpiece from one work station to another includes positioning the workpiece along selected X and Y axes wherein the intersection of the axes is a point known as a zero position about which programming is performed by the microprocessor. The workpiece is first fed into a shear for a programmed length; a manipulator grasps the part when the workpiece is sheared. The manipulator then rotates the sheared workpiece along the Y axis and moves the workpiece a programmed distance from the zero position of the first work station to the zero position of a second work station. The workpiece is then drilled. When the drilling operation is completed a third manipulator receives the drilled workpiece at the zero axis and moves the workpiece to the zero position of a third work station where the workpiece is profiled. When the profiling operation is completed a fourth manipulator moves the workpiece to the zero position of a fourth work station where a bending operation completes the work on the workpiece. While the four work stations are mentioned above, it can be appreciated that any number of different types of work stations can be used for a particular workpiece with microprocessor control moving the workpiece along a known distance in a X and Y plane.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates the workpiece positioned along an X and Y axis.

FIG. 2 illustrates the workpiece along X and Y axes and at five different positions where shear, drill, profile and bend operations are performed.

FIG. 3 illustrates the overall fabrication system under microprocessor control.

FIG. 3A and 3B schematically depict computer control systems for operating the fabrication system of FIG. 3.

FIG. 4 illustrates a workpiece manipulator with manipulator arm in a vertical position.

FIG. 5 illustrates the manipulator moved forward for gripping the workpiece before it is sheared.

FIGS. 6 and 7 illustrate the manipulator arm raising the sheared workpiece and rotating it into a position for performing a drilling operation.

FIGS. 8 and 9 illustrate a second manipulator with arm for gripping the drilled workpiece.

FIGS. 10 and 11 illustrate the second manipulator rotating the drilled workpiece into a vertical position and lowering it for the profile operation.

FIGS. 12 and 13 illustrate a third manipulator with arm for gripping the profiled piece.

FIGS. 14 and 15 illustrate a third manipulator raising the profiled workpiece into a vertical position and lowering it for the bending operation.

FIGS. 16, 17, 18 and 19 illustrate a fourth manipulator for removing the completed workpiece from the fabrication station.

FIGS. 20 and 21 illustrate detailed views of the bending operation of the workpiece.

DETAILED DESCRIPTION OF THE DRAWINGS

In FIG. 1 a workpiece is designated by general reference numeral 10 having a selected X axis 12 and a Y axis 14. The Y axis 14 acts as a centerline of the workpiece 10. At the intersection of the X axis 12 and the Y axis 14 is a zero position 16 about which all of the programming is performed.

Referring now to FIG. 2 the centerline or Y axis 14 is shown intersecting a plurality of X axes. A first work station has a X axis 18 with a zero position 20, a second work station with X axis 22 and a zero position 24, a third wrok station with X axis 26 having a zero position 28 and a fourth work station with X axis 30 and a zero position 32.

The overall fabrication station is shown in FIG. 3 and given general reference numeral 34. The station 34 includes a plurality of workpiece manipulators which are not shown in the drawings but can be a plurality of individual robots having workpiece manipulators with manipulator arms 36, 38, 40 and 42. Each of these manipulators have a home position 37, 39, 41 and 43. In FIG. 2 the manipulator arms are shown in a vertical position and at a known distance to the adjacent work stations. Further, the manipulators are positioned along the centerline or Y axis 14.

Referring now to FIGS. 4 and 5, each time the workpiece 10 is picked up for transfer to the next station, the manipulator arm, in this example 36, is programmed to move from its home position 37 to X axis 44 a selected distance from the zero position 20 of the first work station and then with the workpiece engaged a shearing operation is performed at the first work station. When the operation is completed the manipulator returns to its home position 37 and the arm 36 raises the workpiece 10 into a vertical position as shown in FIG. 6.

In FIG. 7 the arm 36 is programmed to lower the workpiece 10 and move a selected distance to the intersection of X axis 46 and the Y axis 14. Through computer programmed control and knowing the distance between the home position of the manipulator arm 36 and the zero position 24 of the second work station the arm 36 indexes the zero position 16 of the workpiece 10 with the zero position 24. The workpiece is then clamped in place and released by the arm 36 which returns to its original home position 37 upstream along the Y axis 14.

Referring now to the machining operation of the fabrication station 34 shown in FIG. 3, a program length of workpiece stock 48 is fed into a shear 50. The programmed zero position 20 of the shear 50 or first work station is known. Manipulator arm 36 rotates to a horizontal position as shown in FIG. 5 and with gripper jaws grips the workpiece 10. The shear 50 is then programmed to shear the workpiece stock 48 thus starting the fabrication of the workpiece 10. The manipulator arm 36 then moves downstream to its home position 37 and rotates upwardly to a vertical position as shown in FIG. 6.

The manipulator arm 36 now lowers the workpiece 10 and moves toward X axis 22 a programmed distance to position 46. The manipulator arm 36 places the workpiece 10 indexed on zero position 24 of the second work station or in this example, a drilling operation 52. Workpiece clamps are now programmed to close on the workpiece 10. The grippers of the arm 36 in FIG. 7 are now programmed to open. The manipulator arm 36 is now programmed to reverse to its home position 37 when the arm 36 is again programmed to return to its raised vertical position as shown in FIG. 4.

The second manipulator arm 38 at its home position 39 along the Y axis 14 is shown in FIG. 3 and FIG. 8. The drilling operation is programmed from the zero position 24 at the second work station and the zero position 16 of the workpiece 10. Further, the X axis 12 of the workpiece 10 coincides with the X axis 22 of the drill station shown in FIG. 8. In FIG. 9 the manipulator arm 38 has been lowered to a horizontal position and moved upstream along the Y axis 14 to a known position 54. The manipulator arm 38 grips the workpiece 10 in place and a plurality of holes 55 are drilled in the workpiece 10. The manipulator arm 38 with workpiece 10 then returns to its home position 39 where the workpiece 10 is raised to a vertical position as shown in FIG. 10. In FIG. 11 the manipulator 38 has moved forward to a known position 56 for delivering the workpiece 10 to a third work station or profile operation 58. The manipulator arm 38 releases the drilled workpiece 10 at the profile operation 58 and the workpiece is clamped in place. The manipulator arm 38 then returns to its home position 39 upstream along the Y axis 14. The clamping mechanism on the profile operation 58 is programmed to close and hold the workpiece 10 in place. In this operation, a router cutter 60, shown in FIG. 3, is fed into the workpiece 10 a programmed distance and then simultaneously the rotation of the profile operation 58 and the router cutter 60 are programmed to move in and out and rotate to produce a 360° profile of the workpiece 10 shown in FIG. 12.

A third manipulator arm 40 shown in FIG. 12 at a home position 41 along Y axis 14 is moved downstream a known distance to a position 62 shown in FIG. 3 wherein the manipulator arm 40 grips the profiled workpiece 10 with the clamping mechanism of the profile operation 58 opening and releasing the workpiece 10. The manipulator arm 40 with workpiece 10 then returns to its home position 41 where it is raised into a vertical position as shown in FIG. 14. In FIG. 15 the profiled workpiece 10 is now lowered to a horizontal position and moved downstream by the manipulator arm 40 to a known distance at position 64. The profiled workpiece 10 is now released at a fourth work station or a brake operation 66. The third manipulator 40 having released, the workpiece 10 is returned upstream to its home position 41. The zero position 16 of the workpiece 10 is located in a predetermined special relation to zero position 32 of the brake operation.

In a brake operation, brake ram 70 with a punch 72, shown in FIG. 20 is lowered on top of the workpiece 10 received between a pair of dies 74 a programmed distance and retracted to a neutral position 78, as shown in FIG. 21, to produce a known angle in the workpiece 10 a known distance from zero position 16 of workpiece 10.

When the brake operation has been completed a fourth manipulator arm 42 at its home position 43 moves upstream to a known position 86 shown in FIG. 17. The manipulator arm 42 grips the completed workpiece 10 and then returns to its home position 43 where the workpiece 10 is raised into a vertical position. The manipulator arm 42 then moves a known distance downstream to a position 88 where the workpiece is lowered to a horizontal position and the finished workpiece is released. The manipulator arm 42 then returns to its home position 43.

Referring back to FIG. 3A the fabrication station 34 is operated by a master computer 100 programmed for receiving a day's operation from CAD and CAM data source 102. The computer 100 is supported by an integrated information support system indicated by arrow 104, a cost data system 106, an inventory collection system 108 and a manufacturing control material system 110. The computer 100 also communicates with a command computer 112 which, for example, provides stock width and material specifications to the material station indicated by arrow 114. The computer 112 is further connected to the shear operation 50 providing blank length and robot carriage travel via arrow 116. As to the drilling operation 52, data is provided via arrow 118, such as hole diameter and location, robot carriage length of travel and drill size. Via arrow 120, the profiled station 58 recieves the information such as position of robot grippers on the workpiece, profile relation to X and Y axes of the workpiece and profile around intersection of the X and Y axes of the workpiece. Arrow 122 indicates data to the bend operation 66 for providing position of centerline of bend relative to the X and Y axes of the workpiece, position of robot grippers on the workpiece and degree of angle and bend radius.

In FIG. 3B, a hard programmed slave computer is indicated by reference numeral 124 which is connected to the individual work stations for providing to the material operations via arrow 126 data such as cartridge load, material vertification and diagnostic electronics.

Data to the shear operation indicated by arrow 128 provides material feed information, material thickness, part number, shear information, robot arm rotation and similar data. Arrow 130 indicates information from the hard programmed slave computer 124 to the drill operation with data such as position of blank holder, drill adapter storage transfer and removal information, drill cycle, robot arm rotation and other related information. Arrow 132 provides data to the profile operation 58 such as profile set-up, robot arm rotation, robot gripper action and diagnostics of electronics. The last arrow 134 provides data from the slave computer 124 to the bend operation such as punch exchange, set-up of dies, position of brake, sequence of robot and brake mechanism, robot gripper action and additional electronic information.

While the fabrication of workpiece 10 is shown having operations such as shearing, drilling, profile and bending before the workpiece is completed, it can be appreciated that this method using computer control of work stations along a plurality of X axes and a common Y axis can be used equally well for a variety of machining applications without departing from the scope and spirit of the invention.

What is claimed is:

1. A method of fabricating a workpiece, the workpiece having a X and Y axis with the intersection of the axis called a zero position of the workpiece, using workpiece manipulators and work stations under computer control, the manipulators and work stations positioned along a common Y axis with individual X axis intersecting the Y axis, the intersection of the individual X axis of the work stations with the Y axis called a zero position of the work stations which is a known distance from the intersection of the X axis of the manipulators with the Y axis and called a home position of the manipulators, the steps including:

feeding the workpiece onto a first work station, the zero position of the workpiece indexed with the zero position of the first work station;

moving a first manipulator a programmed distance along the Y axis upstream and toward the workpiece and gripping the workpiece in place;

providing work on the workpiece by the first work station;

moving the first manipulator with workpiece downstream along the Y axis and returning the first manipulator to its home position; and moving the first manipulator with workpiece downstream a programmed distance and indexing the zero position of the workpiece with the zero position of a second work station and releasing the workpiece thereon.

2. The method as described in claim 1 further including moving a second manipulator a programmed distance along the Y axis upstream and toward the workpiece on the second work station, gripping the workpiece in place, providing work on the workpiece by the second work station, moving the second manipulator with workpiece downstream along the Y axis and returning the second manipulator to its home position and moving the second manipulator with workpiece downstream a programmed distance and indexing the zero position of the workpiece with the zero position of a third work station and releasing the workpiece thereon.

3. The method as described in claim 2 further including moving a third manipulator a programmed distance along the Y axis upstream toward the workpiece, gripping the workpiece in place on the third work station, providing work on the workpiece by the third work station, moving the third manipulator with workpiece downstream along the Y axis and returning the third manipulator to its home position, and moving the third manipulator with workpiece downstream a programmed distance and indexing the zero position of the workpiece with the zero position of a fourth work station and releasing the workpiece.

4. The method as described in claim 3 further including moving a fourth manipulator a programmed distance along the Y axis upstream toward the workpiece, gripping the workpiece in place on the fourth work station, providing work on the workpiece by the fourth work station, moving the fourth manipulator with workpiece downstream along the Y axis and returning the fourth manipulator to its home position, and moving the fourth manipulator with workpiece downstream a programmed distance and releasing the completed workpiece.

5. A method of fabricating a workpiece, the workpiece having a X and Y axis with the intersection of the axis called a zero position of the workpiece, using workpiece manipulators and work stations under computer control, the manipulators and work stations positioned along a common Y axis with individual X axis intersecting the Y axis, the intersection of the individual X axis of the work stations with the Y axis called a zero position of the work station which is a known distance from the intersection of the X axis of the manipulators with the Y axis and called a home position of the manipulators, the steps including:

feeding the workpiece onto a first work station, the zero position of the workpiece indexed with the zero position of the first work station;

moving a first manipulator having a manipulator arm from a vertical position to a horizontal position and along the Y axis a programmed distance upstream and toward the workpiece, the manipulator arm gripping the workpiece and holding it in place on the first work station;

providing work on the workpiece by the first work station;

moving the first manipulator with manipulator arm holding the workpiece downstream along the Y axis and returning the first manipulator to its home position and moving the manipulator arm with workpiece upwardly from a horizontal position to a vertical position; and lowering the first manipulator arm with workpiece from a vertical position to a vertical position and moving the first manipulator with manipulator arm holding the workpiece downstream a programmed distance and indexing the zero position of the workpiece wtih the zero position of a second work station and releasing the workpiece thereon.

6. The method as described in claim 5 further including moving a second manipulator with manipulator arm from a vertical position to a horizontal position along the Y axis a programmed distance upstream and toward the workpiece on the second workpiece station, gripping the workpiece with the manipulator arm in place, providing work on the workpiece by the second work station, moving the second manipulator with manipulator arm holding the workpiece downstream along the Y axis and returning the second manipulator to its home position and raising the second manipulator arm with workpiece from a horizontal position to a vertical position, lowering the second manipulator arm with workpiece from a vertical position to a horizontal position and moving the second manipulator with manipulator arm holding the workpiece downstream a programmed distance and indexing the zero position of the workpiece with the zero position of a third work station and releasing the workpiece theron.

7. An automated apparatus for performing a plurality of manufacturing operations on a workpiece having a predetermined reference point defined by the intersection of predetermined axes, said apparatus comprising;
   a plurality of workstations each having a predetermined zero position defined by the intersction of predetermined axes and including means for performing a manufacturing operation on said workpiece, said workstations being arranged in a predetermined relation to each other and the zero positions of said workstations having a defined, predetermined spatial relation;
   means for fixing said workpiece at each said workstation with a predetermined relative orientation of the respective axes and with said reference point disposed in a predetermined spatial relation to the respective zero position of said workstation;
   means for moving said workpiece between workstations, said moving means including means for releasably gripping said workpiece, for manipulating said workpiece to a predetermined axial orientation while maintaining a predetermined spacial relation between said reference point and the zero positions of said workstations, and for locating said workpiece in said predetermined orientation at said workstations; and
   computer means for defining said workpiece axes and reference point, said work station axes and zero position and said relative axial orientation and reference point to zero positions spacial relation and for selectively controlling said performing means, fixing means and moving means.

8. The apparatus of claim 7 wherein said workstations are arranged to have a first workstation disposed for receiving a workpiece blank.

9. The apparatus of claim 8 also including means for feeding said workpiece blank to said first workstation in a predetermined axial orientation.

10. The apparatus of claim 9 wherein said workpiece is substantially planar sheet metal, wherein said feeding means introduces into said first workstation one end of an elongated piece of said sheet metal, and wherein said first workstation cuts from said one end said workpiece blank of a defined, predetermined size.

11. The apparatus of claim 7 wherein said means for fixing said workpiece at at least one said workstation comprises said moving means holding said workpiece in said predetermined orientation during said manufacturing operation.

12. The apparatus of claim 7 wherein said workstations are sequentially arranged in spaced, adjacent axial relationship and wherein one said moving means is moveably disposed between each set of adjacent workstations.

13. The apparatus of claim 12 wherein each said moving means has a predetermined, defined home position having a predetermined spacial relation to the axes and zero positions of said adjacent workstations, said moving means being selectively moveable to and from said home position during movement of said workpiece between said adjacent workstations.

14. A method of sequentially performing a plurality of manufacturing operations on a workpiece using a plurality of sequentially arranged workstations each performing at least one said manufacturing operation, said method comprising the steps of:
   defining on said workpiece predetermined axes and a reference point at the intersection of said axes;
   defining at each said workstation predetermined axes and a zero position at the intersection of said axes;
   sequentially moving said workpiece between said workstations while manipulating said workpiece to a predetermined axial orientation and maintaining a predetermined spacial relation between the reference point of said workpiece and the zero positions of said workstations;
   locating said workpiece at each said workstation in a predetermined relative axial orientation and with a predetermined spacial relation between the reference point of said workpiece and the zero position of the respective workstation;
   performing at least one manufacturing operation on said workpiece at each said workstation; and
   remotely controlling the moving, locating and performing steps with reference to said defined axes, zero positions and reference point.

* * * * *

UNITED STATES PATENT AND TRADEMARK OFFICE
CERTIFICATE OF CORRECTION

PATENT NO. :          4,700,308
DATED     :          October 13, 1987
INVENTOR(S) :         Everett E. Jones It is certified that error appears in the above-identified patent and that said Letters Patent is hereby corrected as shown below:

Column 2, line 53, change "wrok" to --work--.

Column 7, Claim 7, line 13, "intersction" should be --intersection--.

Signed and Sealed this

Fifth Day of April, 1988

Attest:

DONALD J. QUIGG

Attesting Officer

Commissioner of Patents and Trademarks